United States Patent
Yang et al.

(10) Patent No.: US 7,595,857 B2
(45) Date of Patent: Sep. 29, 2009

(54) METHOD OF FABRICATING LIQUID CRYSTAL DISPLAY DEVICE

(75) Inventors: Myoung-Su Yang, Gyeonggi-Do (KR);
Jae-Kyun Lee, Gyeonggi-Do (KR);
Jung Il Lee, Seoul (KR); Jun-Beom Cho, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 404 days.

(21) Appl. No.: 11/478,553

(22) Filed: Jun. 30, 2006

(65) Prior Publication Data

US 2007/0146622 A1    Jun. 28, 2007

(30) Foreign Application Priority Data

Dec. 23, 2005    (KR) ............... 10-2005-0129077

(51) Int. Cl.
*G02F 1/1339*    (2006.01)
*G02F 1/13*    (2006.01)
*G02F 1/1341*    (2006.01)

(52) U.S. Cl. ............... 349/187; 349/153; 349/154; 349/189

(58) Field of Classification Search ............... 349/189
See application file for complete search history.

(56) References Cited

U.S. PATENT DOCUMENTS

| | | | |
|---|---|---|---|
| 4,610,510 A * | 9/1986 | Funada et al. | 349/187 |
| 5,835,181 A * | 11/1998 | Nakamura et al. | 349/189 |
| 6,678,029 B2 * | 1/2004 | Suzuki | 349/154 |
| 6,734,943 B2 * | 5/2004 | Noiri | 349/153 |
| 2001/0005255 A1 * | 6/2001 | Niiya et al. | 349/155 |
| 2001/0012089 A1 * | 8/2001 | Shiraishi | 349/153 |
| 2003/0169392 A1 | 9/2003 | Park et al. | |
| 2005/0001974 A1 * | 1/2005 | Iida et al. | 349/187 |
| 2006/0044508 A1 * | 3/2006 | Mochizuki | 349/189 |

FOREIGN PATENT DOCUMENTS

| | | |
|---|---|---|
| CN | 1442738 A | 9/2003 |
| JP | 59-231516 A | 12/1984 |

\* cited by examiner

*Primary Examiner*—Uyen-Chau Le
*Assistant Examiner*—Chris Chu
(74) *Attorney, Agent, or Firm*—McKenna Long & Aldridge

(57) ABSTRACT

A method of fabricating a liquid crystal display device includes: preparing a first substrate in which a plurality of first panels is formed; preparing a second substrate in which a plurality of second panels is formed; forming a seal pattern around an outer edge of the panel, the seal pattern defining an active region and a dummy region and having at one side a protruding portion extending to the dummy region; dropping liquid crystal more than the reference amount to the active region; bonding the first and second substrates together by the seal pattern; separating a plurality of liquid crystal panels by cutting the first and second substrates, the liquid crystal panels being formed by bonding the first and second panels; and removing surplus liquid crystal from the liquid crystal panel by pressurizing the liquid crystal panel. Accordingly, image quality deterioration due to an insufficient or excessive amount of provided liquid crystal is prevented by forming the protruding portion at the seal pattern and removing the surplus liquid crystal from the liquid crystal panel or providing liquid crystal through the protruding portion.

18 Claims, 8 Drawing Sheets

METHOD OF FABRICATING LIQUID CRYSTAL DISPLAY DEVICE

This application claims the benefit of the Korean Application No. 2005-129077 filed on Dec. 23, 2005, which is hereby incorporated by reference for all purposes as if fully set forth herein. This application incorporates by reference co-pending application Ser. No. 10/184,096, filed on Jun. 28, 2002 entitled "SYSTEM AND METHOD FOR MANUFACTURING LIQUID CRYSTAL DISPLAY DEVICES FROM LARGE MOTHER SUBSTRATE PANELS"; and co-pending application Ser. No. 10/184,096, filed on Jun. 29, 2006, entitled "METHODS OF MANUFACTURING LIQUID CRYSTAL DISPLAY DEVICES" for all purposes as if fully set forth herein.

BACKGROUND OF THE INVENTION

1. Field of the Invention

The present invention relates to a liquid crystal display (LCD) device using a dispensing method, and more particularly, to a method of fabricating a liquid crystal display device capable of improving image quality by preventing gravity defects in liquid crystal display.

2. Description of the Background Art

With the recent development of various portable electronic devices such as a mobile phones, PDAs, notebook computers, light and thin flat panel display devices are increasingly demanded. Research is actively ongoing on such flat panel display devices including liquid crystal displays (LCDs), plasma display panels (PDPs), field emission displays (FEDs), vacuum fluorescent displays (VFDs) and the like. Of those devices, the LCD devices are drawing much attention because of the ability to be mass produced, the relatively easy operation of their driving units, and their implementation of high image quality.

FIG. 1 is a schematic cross-sectional view of a general LCD device. As illustrated in the drawing, an LCD device 1 includes a lower substrate 5, an upper substrate 3, and a liquid crystal layer 7 formed between the lower and upper substrates 5 and 3. The lower substrate 5 is a driving device array substrate. Although not illustrated in the drawing, a plurality of pixels are formed on the lower substrate 5, and a driving device, such as a thin film transistor (TFT) is formed in each pixel. The upper substrate 3 is a color filter substrate and includes a color filter layer for implementing actual colors. Also, a pixel electrode and a common electrode are formed on the lower substrate 5 and the upper substrate 3, respectively, and alignment layers are applied thereon to align liquid crystal molecules of the liquid crystal layer 7.

The lower substrate 5 and the upper substrate 3 are bonded together by a sealing material 9, and the liquid crystal layer 7 is formed therebetween. Thus, the liquid crystal molecules are driven by the driving device formed on the lower substrate 5 to control the transmittance of light passing through the liquid crystal layer, thereby displaying information.

A process of fabricating an LCD device may be divided into a driving device array substrate process for forming driving devices on the lower substrate 5, and a color filter process and a cell process for forming a color filter on the upper substrate 3. Such processes for the LCD will now be described with reference to FIG. 2.

In the driving device array process, a plurality of gate lines and data lines are arranged on the lower substrate to define pixel areas, and a TFT (for example) connected to the gate and data lines is formed in each of the pixel areas (S101). Also, in the driving device array process, a pixel electrode is formed that is connected to the TFT to drive the liquid crystal layer upon receiving signals through the TFT.

Also, in the color filter process, a red, green and blue (RGB) color filter layer and common electrodes are formed on the upper substrate 3 (S104).

Then, alignment layers are applied on the upper and lower substrates 3 and 5, respectively, and then the alignment layers are rubbed to provide an alignment controlling force or a fixing surface (i.e., a pretilt angle and an alignment direction) to the liquid crystal molecules of the liquid crystal layer formed between the upper and lower substrates 3 and 5 (S102, S105). Thereafter, spacers are dispersed onto the lower substrate to maintain a uniform cell gap, a sealing material is applied along an outer edge of the upper substrate 3, and then the lower and upper substrates 5 and 3 are pressurized and bonded (S103, S106, S107).

The bonded lower substrate 5 and the upper substrate 3 are formed form large-sized glass substrates. That is, a plurality of panel regions are formed in each large-sized glass substrate, and a TFT and a color filter layer are formed in such panel regions, respectively. For this reason, in order to fabricate each individual liquid crystal panels, the glass substrates should be cut and processed (S108). Thereafter, a liquid crystal is injected through a liquid crystal injection hole into each liquid crystal panel processed in the aforementioned manner to form the liquid crystal layer. Then, the liquid crystal injection hole is encapsulated or "plugged", and then the liquid crystal panel is examined, thereby fabricating an LCD device (S109, S110).

Here, the injecting of the liquid crystal is achieved by the following processes. That is, as illustrated in FIG. 3, a nitrogen gas (N2 gas) is supplied into a vacuum chamber in a state where an injection hole 16 of a liquid crystal panel 1 is in contact with the liquid crystal, and thus a degree of vacuum of the chamber 10 is lowered. Then, the liquid crystal 14 is injected into the panel 1 by the difference between the internal pressure of the liquid crystal panel 1 and the pressure of the vacuum chamber 10. After the panel 1 is completely filled with the liquid crystal, the injection hole 16 is encapsulated by an encapsulating material, thereby forming a liquid crystal layer (This type of injection method is called a vacuum injection method of liquid crystal).

However, disadvantageously, it takes a long time to inject liquid crystal into a panel through the injection hole 16. That is, only a very small amount of liquid crystal is injected into the liquid crystal panel per unit time because this is only a very small gap of just a few micrometers (μm) between the driving device array substrate and the color filter substrate of the liquid crystal panel. For example, when a liquid crystal panel of approximately 15 inches is fabricated, it takes approximately 8 hours to complete the injection of liquid crystal. Such injection of liquid crystal over a long period of time delays the fabrication process of the liquid crystal panel, and thus deteriorates fabrication efficiency. Particularly, the vacuum injection method is inadequate for a large-sized liquid crystal panel because the time it takes to inject liquid crystal increases as liquid crystal panels become larger.

SUMMARY OF THE INVENTION

Accordingly, the present invention is directed to a method of fabricating a liquid crystal display device that substantially obviates one or more of the problems due to limitations and disadvantages of the related art.

Therefore, an advantage of the present invention is to provide a method of fabricating a liquid crystal display (LCD) device capable of improving processing efficiency of the LCD device by dropping liquid crystal directly onto a large-sized glass substrate including at least one panel region, and uniformly distributing the dropped liquid crystal over the entire panel region by a bonding pressure of a liquid crystal panel to thereby form a liquid crystal layer quickly.

Another advantage of the present invention is to provide a method of fabricating an LCD device capable of preventing gravity inferiority of liquid crystal by forming a protruding portion of the seal pattern extending to a dummy region from one side of a seal pattern, dropping an amount of liquid crystal on a glass substrate, discharging or injecting liquid crystal through the protruding portion that has been cut or thinned in a cutting process, and encapsulating the cut protruding portion.

To achieve these and other advantages and in accordance with the purpose of the present invention, as embodied and broadly described herein, there is provided a method of fabricating a liquid crystal display device, comprising preparing a first substrate; preparing a second substrate, the first substrate and the second substrate including a plurality of pre-defined unit panel regions; forming a seal pattern within each of the predefined unit panel regions on one of the first and second substrates, the seal pattern having an active pattern and a dummy pattern, wherein the dummy pattern protrudes from the active region; dispensing liquid crystal in the pre-defined unit panel regions on one of the first and second substrates; bonding the first and second substrates together using the seal pattern; cutting the bonded first and second substrates into unit panels corresponding the predefined unit panel regions; and adjusting the amount of liquid crystal in at least one unit panel.

The separating of the plurality of liquid crystal panels by cutting the first and second substrates includes forming an aperture by cutting part of the dummy pattern of the seal pattern. In the adjusting of the amount of liquid crystal, surplus liquid crystal filled in the liquid crystal panel is removed through the aperture by pressurizing the liquid crystal panel. Also, in the adjusting of the amount of liquid crystal, a predetermined amount of liquid crystal is injected into the panel through the aperture.

Further, the method of fabricating a liquid crystal display device according to this invention may includes preparing a first substrate; preparing a second substrate, the first substrate and the second substrate including a plurality of unit panel regions; forming a seal pattern substantially along an outer edge of the unit panel regions, the seal pattern having a protruding portion extending to one side of the seal pattern; dispensing liquid crystal more than a predetermined reference amount to the panel regions; bonding the first and second substrates by the seal pattern; hardening the seal pattern; separating the bonded first and second substrates into a plurality of liquid crystal panels by cutting the first and second substrates outside edges of the seal pattern except the protruding portion of the seal pattern and cutting the protruding portion; discharging a portion of liquid crystal from the liquid crystal panel through the cut protruding portion; and encapsulating the cut protruding portion using an encapsulating material.

In another aspect of the present invention, a method of fabricating a liquid crystal display panel includes preparing a first substrate; preparing a second substrate, the first substrate and the second substrate including a plurality of unit panel regions; forming a seal pattern substantially along an outer edge of the unit panel regions, the seal pattern having a protruding portion extending to one side of the seal pattern; dispensing liquid crystal more than a predetermined reference amount to the panel regions; bonding the first and second substrates by the seal pattern; hardening the seal pattern; separating the bonded first and second substrates into a plurality of panels by cutting the first and second substrates outside edges of the seal pattern, wherein the protruding portion is cut such that part of the protruding portion of the seal pattern remains; forming an aperture by bursting the remaining part of protruding portion of the seal pattern by pressurizing the liquid crystal panel; discharging a portion of the liquid crystal from the liquid crystal panel through the aperture; and encapsulating the aperture by using an encapsulating material.

In another aspect of the present invention, a method of fabricating a liquid crystal display device includes preparing a first substrate; preparing a second substrate, the first substrate and the second substrate including a plurality of unit panel regions; forming a seal pattern substantially along an outer edge of the unit panel regions, the seal pattern having a protruding portion extending to one side of the seal pattern; dispensing liquid crystal more than a predetermined reference amount to the panel regions; bonding the first and second substrates by the seal pattern; hardening the seal pattern; separating the bonded first and second substrates into a plurality of panels by cutting the first and second substrates outside edges of the seal pattern, wherein the protruding portion is cut such that part of the protruding portion of the seal pattern remains; forming an aperture by bursting the remaining part of protruding portion of the seal pattern by pressurizing the liquid crystal panel; discharging a portion of the liquid crystal from the liquid crystal panel through the aperture; and encapsulating the aperture by using an encapsulating material.

In another aspect of the present invention, a liquid crystal display device includes a first substrate having a plurality of thin film transistors thereon; a second substrate separated from the first substrate by a cell gap and bonded to the first substrate by a seal pattern; liquid crystal in the cell gap; wherein the seal pattern includes a first portion and a second portion, wherein the second portion protrudes from the first portion and includes two substantially parallel parts extending laterally from the first portion having an encapsulation material therebetween.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the embodiments of the present invention, examples of which are illustrated in the accompanying drawings.

Figure 4:
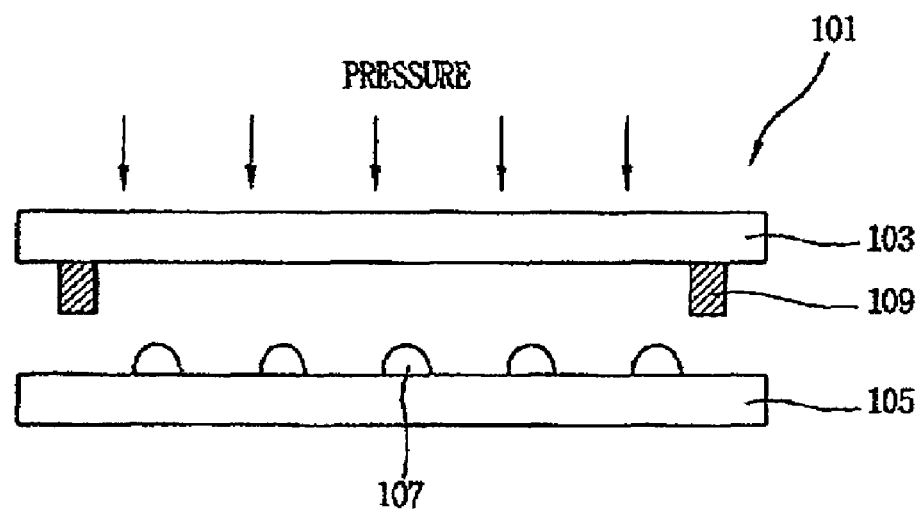
FIG. 4 is a view illustrating a LCD device fabricated by a liquid crystal dispensing method.

FIG. 4 is a view illustrating a basic concept of a liquid crystal dispensing method. As illustrated in the drawing, in the liquid crystal dispensing method, liquid crystal 107 is dropped or dispensed onto a lower substrate 105 before the lower substrate 105 and an upper substrate 103, respectively having a thin film transistor (TFT) and a color filter (CF), are bonded together. The liquid crystal 107 may be dropped onto the substrate 103 having the color filter. That is, in the liquid crystal dispensing method, the liquid crystal may be dropped onto any one of both TFT and CF substrates. However, the substrate onto which the liquid crystal has been dropped should be placed under the other substrate at the time of bonding of the two substrates.

Here, a seal pattern 109 is applied around an outer edge of the upper substrate 103, so that the upper substrate 103 and the lower substrate 105 are bonded together by applying pressure thereto. At the same time, liquid crystal drops 107 are spread widely by the pressure, thereby forming a liquid crystal layer between the upper and lower substrates 103 and 105. That is, such a liquid crystal dispensing method is particularly characterized in that the bonding of a panel 101 using a seal pattern 109 is performed after liquid crystal 107 is dropped onto the lower substrate.

A method of fabricating the LCD device using such a liquid crystal dispensing method is different from a fabrication method adopting the related art liquid crystal injection method. In the related art liquid crystal injection method, after a large-sized glass substrate having a plurality of panel regions is divided into individual panels, injection of liquid crystal is performed. In contrast to this related art method, in the liquid crystal dispensing method, liquid crystal is previously dropped onto a substrate to thereby form a liquid crystal layer, and then the glass substrate can be processed and separated into individual panels. Such process differences provide many advantages in fabricating an actual LCD device. Of course, as for those advantages, some occur due to the liquid crystal dispensing method itself (i.e., rapid generation of a liquid crystal layer), and some occur because a liquid crystal layer is formed in a unit of a glass substrate having a plurality of panel regions. This will now be described in detail by taking the case where four panel regions are formed in a glass substrate as an example. In the liquid crystal injection method, when liquid crystal is injected into four processed liquid crystal panels, the liquid crystal panels having the same cell gaps can be formed only under the same conditions (e.g., the same liquid crystal container, the same injection pressure, etc.). However, in the liquid crystal dispensing method, four processed liquid crystal panels having different cell gaps may be formed by controlling the amount of liquid crystal being dropped onto the liquid crystal panels at once.

In contrast, in the liquid crystal dispensing method, the liquid crystal is dropped onto the substrate through a liquid crystal dispenser. When cell gaps of liquid crystal panels having lower substrates made from one large-sized glass substrate are to be different from one another, the amount of liquid crystal dropped onto each of the panel regions should be precisely and individually controlled, which causes inconvenience. Furthermore, in the liquid crystal dispensing method, the amount of liquid crystal dropped onto the panel regions may be less or more than the set reference amount. Here, the set reference amount refers to the amount of liquid crystal that can be filled in a cell gap region of a liquid crystal panel.

Also, in such liquid crystal dispensing method, a seal pattern is formed in a closed pattern along an outer edge of a panel region and then bonding into a liquid crystal panel is made after the liquid crystal is dropped. For this reason, both additional injection of liquid crystal and removable of surplus liquid crystal cannot be performed even when the amount of liquid crystal provided to the panel region is less or more than the set reference amount.

Therefore, the present invention provides a method of fabricating an LCD device capable of particularly solving those problems by forming a seal pattern that can allow removal of surplus liquid crystal from a liquid crystal panel. That is, a protruding portion is formed that protrudes outward from one side of the seal pattern, and a sufficient amount of liquid crystal is dropped onto the substrate. In a process of separating liquid crystal panels after bonding of the panel, the protruding portion of the seal pattern is cut to thereby form an aperture, and the surplus liquid crystal is removed through the aperture.

Figure 5:
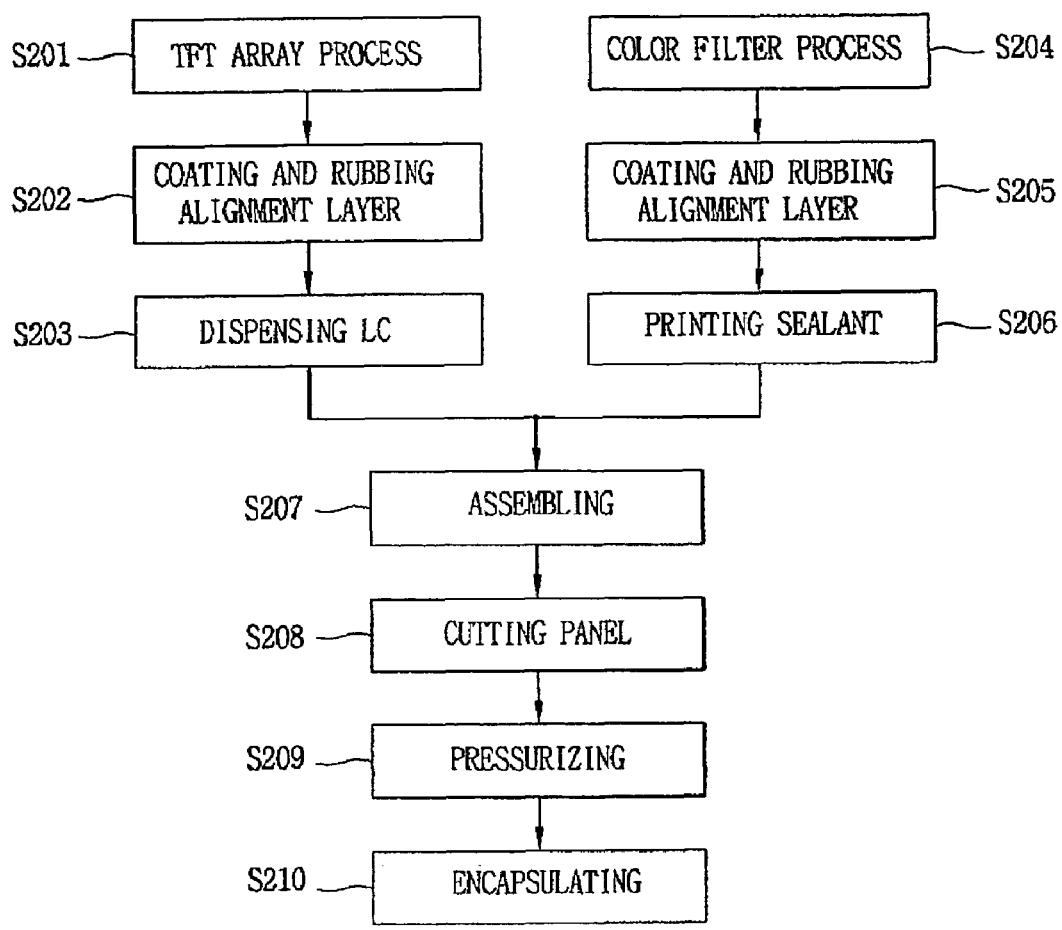
FIG. 5 is a flow chart illustrating a method of fabricating the LCD device according to the present invention.

FIG. 5 is a view illustrating a flow chart of a fabrication process of an LCD device employing the aforementioned liquid crystal dispensing method. FIGS. 6 to 10B are views illustrating a specific fabrication method according to the process order. Accordingly, the method of fabricating an LCD device according to the present invention will now be described with reference to FIG. 5 and FIGS. 6 to 10B.

Figure 1:
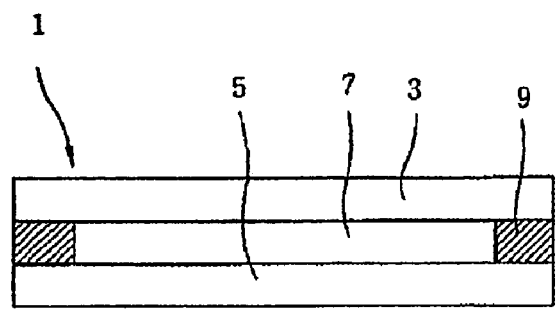
FIG. 1 is a cross-sectional view of a general LCD device.
Figure 2:
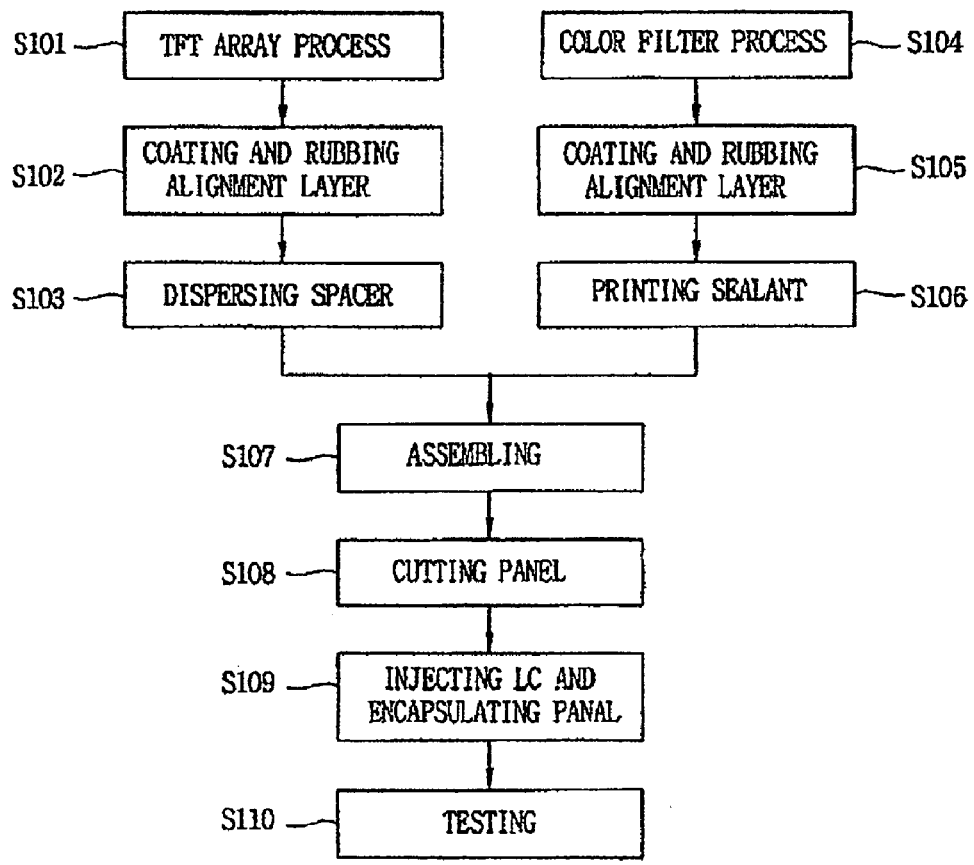
FIG. 2 is a flow chart of the related art method of fabricating an LCD device.
Figure 3:
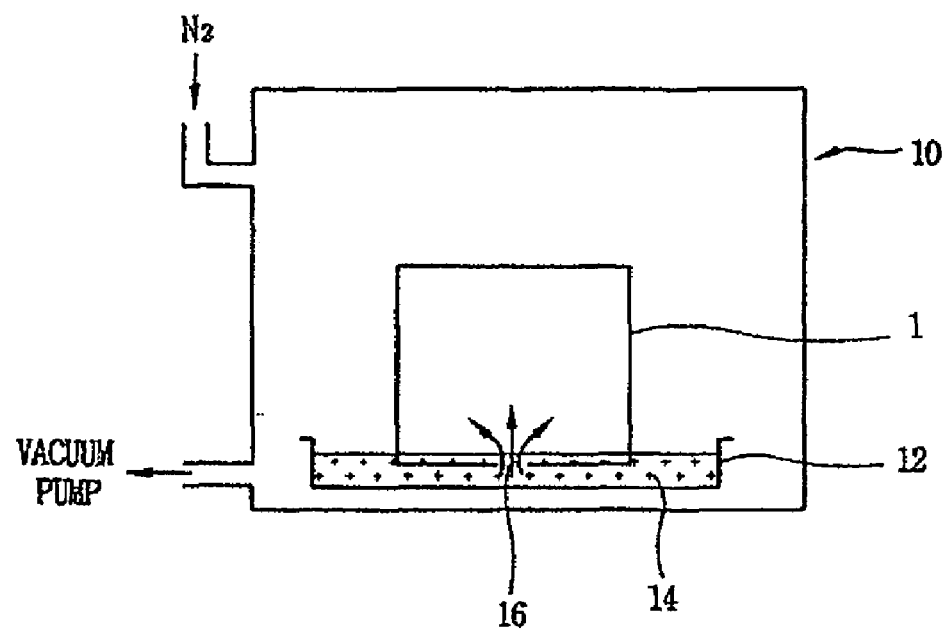
FIG. 3 is a view illustrating injection of liquid crystal according to the related art LCD device.
Figure 6:
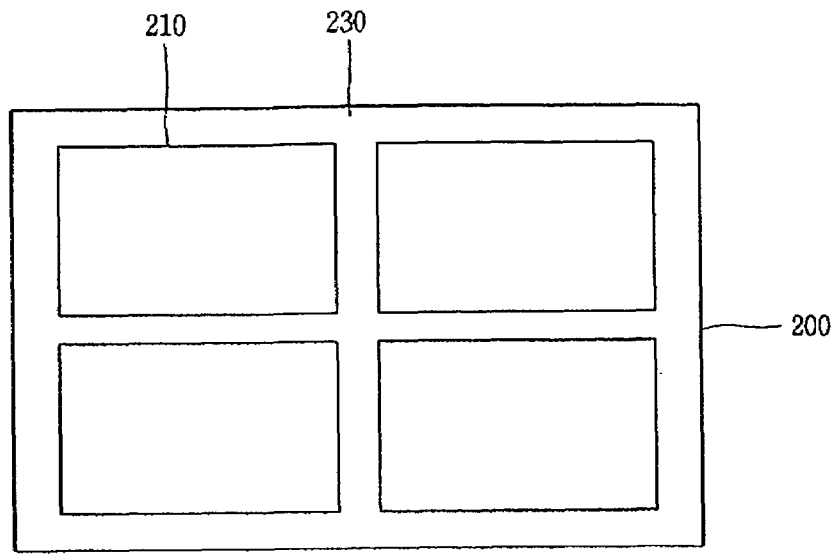
FIG. 6 is a schematic plan view of a thin film transistor array substrate and a color filter substrate defined into panel regions and a dummy region.

As illustrated in FIGS. 5 and 6, substrate 200 having panel regions 210 and dummy regions 230 are defined are prepared. Then, a TFT and a color filter layer (not shown), driving devices and electronic components of the different substrates 200 are formed through a TFT array process and a color filter process, respectively (S201, S202). The TFT array process and the color filter process may be the same as those described above with reference to FIG. 2, and are collectively performed on large-sized glass substrates 200 including a plurality of panel regions 210. Particularly, because the present fabrication method employs the liquid crystal dispensing method, it can be effectively applied to a larger glass substrate (e.g., a large glass substrate having an area of more than 1000×200 mm2).

Then, alignment layers are respectively applied onto a thin film transistor array substrate including the TFT and a color filter substrate including the color filter layer, and then rubbing is performed thereon (S202, S205). The liquid crystal is dropped or dispensed in the panel region on the thin film transistor array substrate, and the seal pattern is formed along an outer edge of the panel region on the color filter substrate (203,S306). Alternately, the liquid crystal may be dropped in the panel region of the color filter substrate and the seal pattern may be applied along an outer edge of the panel region of the thin film transistor array substrate. Also, the dispensing of liquid crystal and the applying of the seal pattern may be performed on one substrate.

Figure 7A:
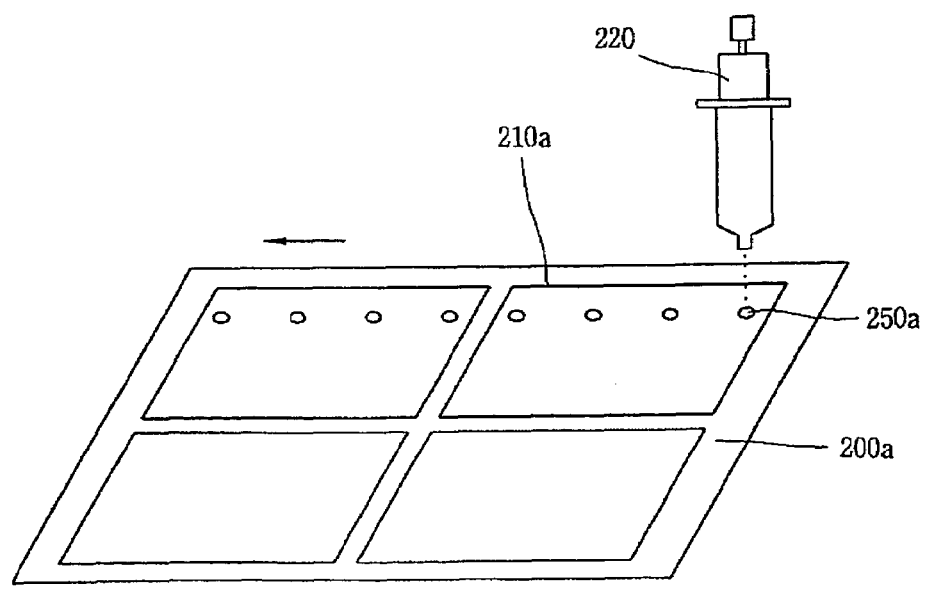
FIG. 7A is a view illustrating a process of dropping liquid crystal on a color filter substrate.
Figure 7B:
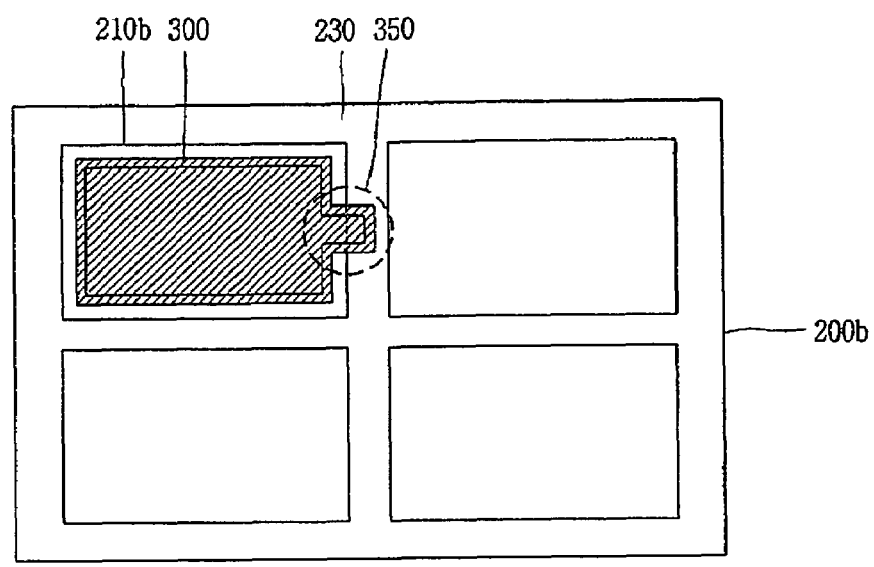
FIG. 7B is a view illustrating a process of forming a seal pattern on a thin film transistor arrays substrate.

FIGS. 7A and 7B are detailed views illustrating processes of dispensing liquid crystal and forming a seal pattern. As illustrated in FIG. 7A, in the liquid crystal dispensing process, a liquid crystal dispenser 220 is placed above a color filter substrate 200a, and then liquid crystal 250a is dropped to a desired region, namely, a panel region, while the substrate 200a is moving. In the present example it is assumed that the amount of liquid crystal 205a dropped to the panel region 210a is more than the set reference amount, so that a cell gap region is over-filled with liquid crystal.

As illustrated in FIG. 7B, a seal pattern 300 is formed along a panel region 210b of a thin film transistor array substrate 200b. Here, one side of the seal pattern 300 extends out of the panel region 210b. That is, a protruding portion 350 extending out of the panel region 210b and protruding to a dummy region 230 is formed at one side of the seal pattern 300.

As described above, the liquid crystal 250a is dropped onto the color filter substrate 210, and the seal pattern 300 is formed on the thin film transistor array substrate 210b. Then, the color filter substrate 210a and the thin film transistor array substrate 210b are aligned. In this state, the two aligned substrates 210a and 210b are pressurized to be bonded together by the seal pattern 300, and, at the same time, the dropped liquid crystal is substantially uniformly distributed over the entire panel by the pressurization (S207). In such a manner, a plurality of liquid crystal panels each having liquid crystal layers is formed in the large-sized glass substrate (the lower substrate and the upper substrate) (S207).

Figure 8:
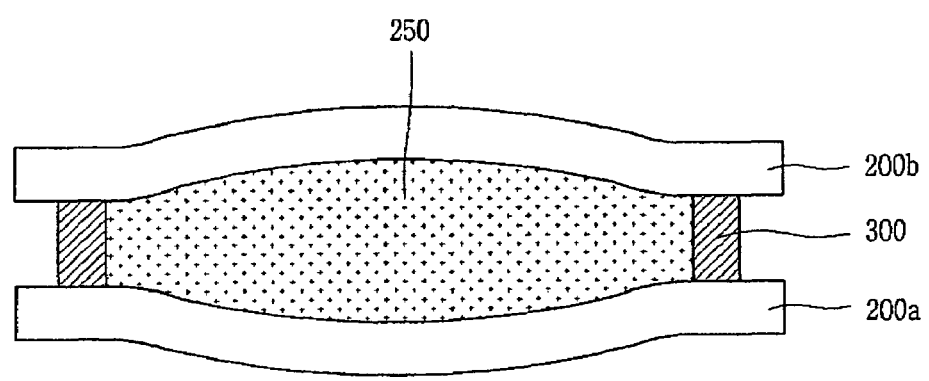
FIG. 8 is a cross-sectional view illustrating a bonding process of the thin film transistor array substrate and the color filter substrate formed by FIGS. 7A and 7B.

FIG. 8 is a cross-sectional view of the liquid crystal panel. As illustrated therein, a liquid crystal layer 250 formed between the color filter substrate 200a and the thin film transistor array substrate 200b may have a thickness greater than a set thickness of a cell gap. This may occur because a surplus of liquid crystal (more than the reference amount) is dropped during dispensing of the liquid crystal.

Figure 9A:
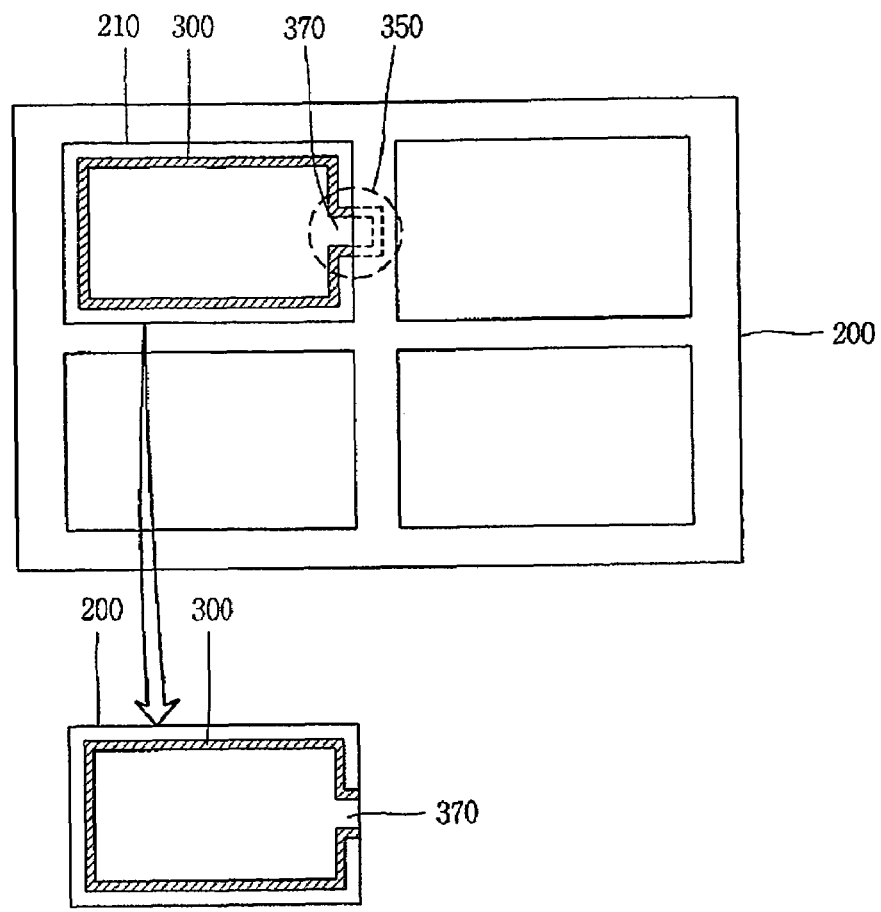
FIGS. 9A and 9B are a plan view and a cross-sectional view, respectively, illustrating a separating and pressurizing a plurality of liquid crystal panels.

Then, the bonded substrates are processed and cut into a plurality of liquid crystal panels (S208). That is, as illustrated in FIG. 9A, the plurality of liquid crystal panels are separated along a cutting line of the substrate 200. Here, the protruding portion of the seal pattern 300 is also cut so that an aperture 370 is formed at one side of the seal pattern.

Figure 11:
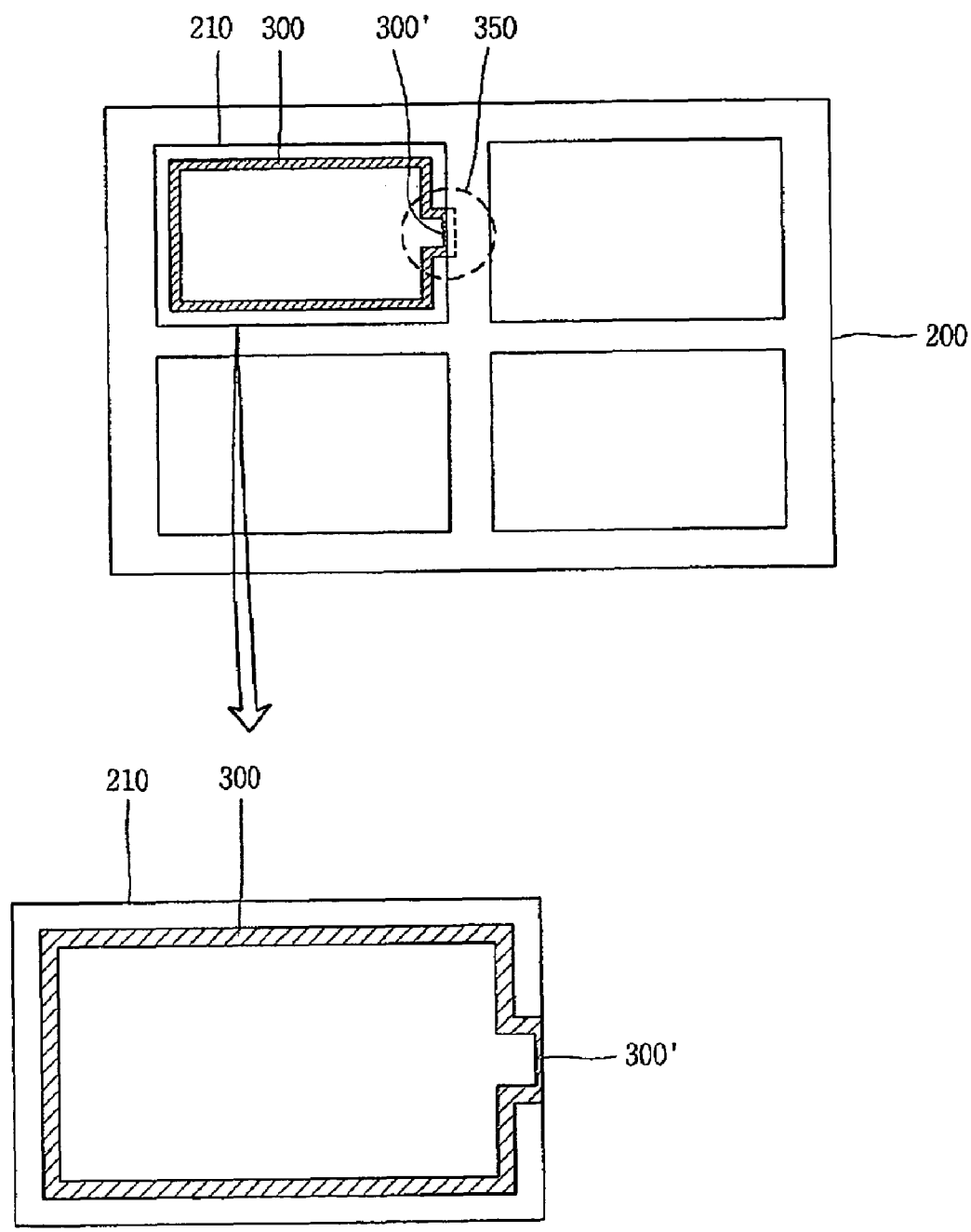
FIG. 11 is a view illustrating a seal pattern protruding portion of an LCD device prior to a cutting process and a unit panel after the cutting process according to another embodiment of the present invention.

Here, as illustrated in FIG. 11, the protruding portion 350 of the seal pattern may be formed in part along the cutting line, and the detailed description thereon will be made later.

Figure 9B:
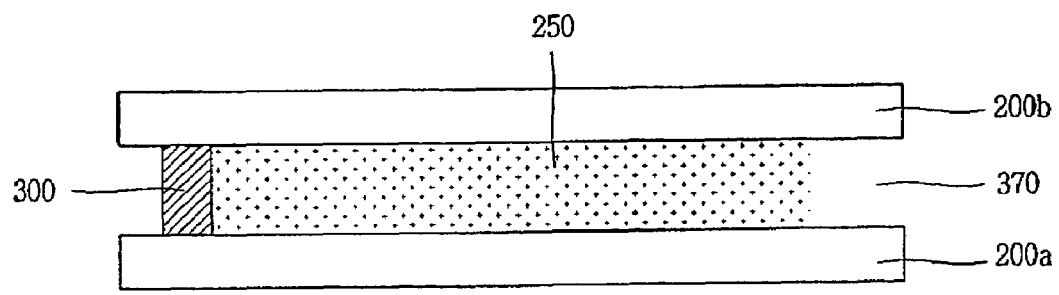

Thereafter, the surplus liquid crystal is removed through a pressurizing process (S209). That is, as illustrated in FIG. 9B, the surplus liquid crystal to the liquid crystal layer 250 is removed through the aperture 370 by pressurizing the color filter substrate 200a and the thin film transistor array substrate 200b, so that the liquid crystal layer has the same height as the set height of a cell gap.

It is also possible to inject liquid crystal through the aperture 370 to add liquid crystal to the liquid crystal layer if the cell gap has been underfilled.

Figure 10A:
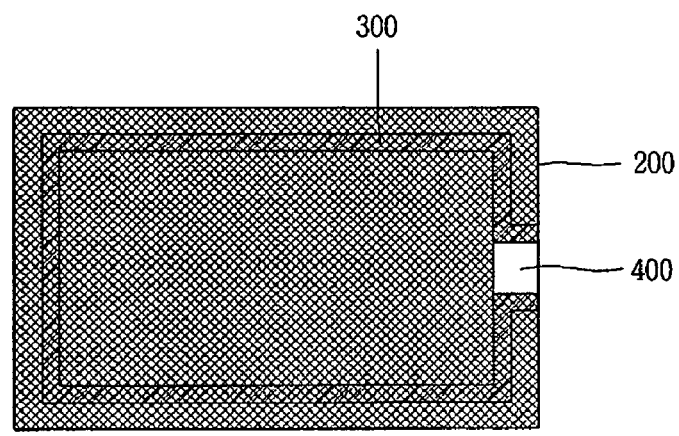
FIGS. 10A and 10B are a plan view and a cross-sectional view, respectively, illustrating an encapsulating process.
Figure 10B:
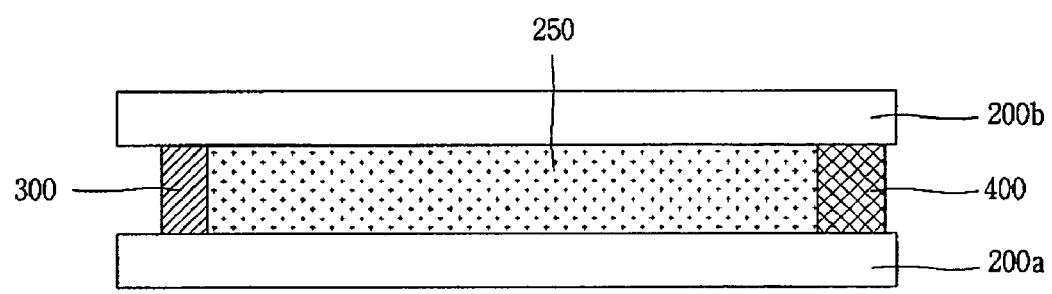

After the removal of the surplus liquid crystal, the aperture is encapsulated by an encapsulating material, thereby completing an LCD device (S210). That is, as illustrated in FIGS. 10A and 10B, the cut region of the seal pattern 300 is encapsulated or "plugged" by an encapsulating material 400, thereby fabricating the LCD device.

The encapsulation using the encapsulating material 400 is performed by injecting a seal material into the aperture and hardening it.

Accordingly, the method of fabricating the LCD device by the liquid crystal dispensing method makes processes simpler than those of the fabrication method using the related art liquid crystal injection method. Thus, the method according to the present invention may improve fabrication efficiency and achieve a high production yield.

In the method of fabricating the LCD device according to the present invention, a protruding portion protruding to a dummy region is formed at one side of a seal pattern, and the protruding portion is cut during the process of separating a liquid crystal panel, thereby forming a seal pattern having an aperture at one side of a liquid crystal panel. Also, surplus liquid crystal is removed from the liquid crystal panel, so that a liquid crystal layer has the same height as a desired cell gap size, so that image quality degradation may be prevented that is caused by an insufficient or excessive amount of liquid crystal.

An LCD device employing a general liquid crystal dispensing method has advantages of a quick manufacturing process. However, such an LCD device may have an image-quality degradation problem due to an insufficient or excessive amount of liquid crystal when an incorrect amount of liquid crystal is removed. Particularly, because it is difficult to precisely control the amount of liquid crystal according to a cell gap, the amount of liquid crystal should be controlled in every liquid crystal panel according to a model of the LCD device. Particularly, in the case of a multi-model glass substrate, the amount of liquid crystal should be controlled for each individual panel region which may be inconvenient.

Therefore, in the present invention, when liquid crystal is dropped, a surplus amount of liquid crystal more than the reference amount may be dispensed and then the surplus liquid crystal is removed. Thus, an accurate amount of liquid crystal may be provided to a liquid crystal panel without causing any of the aforementioned problems. Also, as described above, this becomes possible by forming a protruding portion at a seal pattern that protrudes to the dummy region. That is, in an operation of separating a plurality of liquid crystal panels after bonding of the liquid crystal panel, an aperture is formed at one side of the seal pattern by cutting the protruding portion, and the surplus liquid crystal is removed through the aperture. Also, liquid crystal may be further injected to the panel through the aperture.

However, in the present invention described above, a pressure difference between the liquid crystal layer and the outside of the liquid crystal panel occurs because the aperture is formed by completely removing the protruding seal pattern portion, which may cause bubbles to occur in the liquid crystal layer from the outside through the aperture.

Therefore, in order to minimize the bubble generation in the liquid crystal layer, the present invention may prevent the liquid crystal layer from being exposed to the outside as much as possible by allowing a part of the protruding portion of the seal pattern to remain by partially removing the protruding portion.

That is, as illustrated in FIG. 11, the protruding portion of the seal pattern partially remains on the substrate after the cutting process, so that an internal pressure of the liquid crystal can be maintained. Thereafter, the remaining portion of the seal pattern 300' is opened, punctured or burst, and at the same time, surplus liquid crystal can be removed through the burst region of the seal pattern.

In such a manner, bubble generation due to the pressure difference between the liquid crystal layer and the outside can be prevented by allowing a part of the seal pattern to remain, instead of completely removing the protruding portion of the seal pattern and forming an aperture in the cutting process. That is, when the protruding seal pattern is completely removed in the cutting process to form the aperture, the liquid crystal layer is exposed to the outside through the aperture before and until the pressurizing process Thus the pressure difference between the liquid crystal layer and the outside may cause bubbles to occur in the liquid crystal layer from the outside through the aperture. Therefore, in the present embodiment, a part of the protruding portion of the seal pattern remains during the cutting process, so that the liquid crystal layer is not exposed to the outside right until just before the pressurizing process. Thus, the internal pressure of the liquid crystal layer can be retained. Also, the remaining protruding portion of the seal pattern is burst by the pressure applied to the liquid crystal panel during the pressurizing process, and, at the same time, an aperture is formed and the surplus liquid crystal is removed through this region. Accordingly, bubbles are prevented from being generated in the liquid crystal layer between the cutting process and the pressurizing process.

As described so far, in an LCD device fabricated using the liquid crystal dispensing method according to the present invention, a seal pattern is formed to have a protruding portion to a dummy region, and a part of the protruding portion of the seal pattern is cut in a cutting process for separating a liquid crystal panel to thereby form an aperture. Thus, surplus liquid crystal within the liquid crystal panel may be removed through the aperture, or, liquid crystal may be injected into the liquid crystal panel through the aperture. Accordingly, when the liquid crystal is dispensed in the present invention, a surplus amount of liquid crystal more than the reference amount may be dispensed, and a seal pattern encapsulating process of encapsulating the aperture may be additionally performed.

Furthermore, in the present invention, a part of the protruding portion of the seal pattern may remain in the cutting process, thereby retaining an internal pressure of the liquid crystal layer even after the cutting process. Accordingly, bubbles can be effectively minimized or prevented from being introduced into the liquid crystal layer from the outside.

In the present invention, both the removal of surplus liquid crystal from and additional supply of liquid crystal to the liquid crystal panel may be performed through the aperture formed by pressurizing the liquid crystal panel.

As described so far, an LCD device is fabricated through a liquid crystal dispensing method according to the present invention, so that productivity can be improved through simplified fabrication processes.

Also, according to the present invention, surplus liquid crystal is removed from the liquid crystal panel or liquid crystal is further provided to the liquid crystal panel through a seal pattern protruding to a dummy region. Thus, gravity inferiority due to an excessive or insufficient amount of liquid crystal provided in a liquid crystal panel can be prevented, and thus image quality of an LCD device can be improved.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of fabricating a liquid crystal display device, comprising:

preparing a first substrate;
preparing a second substrate, the first substrate and the second substrate including a plurality of predefined unit panel regions;
forming a seal pattern within each of the predefined unit panel regions on one of the first and second substrates, the seal pattern having an active pattern and a dummy pattern, wherein the dummy pattern protrudes from the active region;
dispensing liquid crystal in the predefined unit panel regions on one of the first and second substrates;
bonding the first and second substrates together using the seal pattern;
cutting the bonded first and second substrates into unit panels corresponding the predefined unit panel regions;
forming an aperture in the seal pattern by bursting the thinned portion of the dummy pattern by pressurizing the at least one unit panel;
removing surplus liquid crystal from the at least one unit panel through the aperture to adjust the amount of liquid crystal in at least one unit panel; and
encapsulating the aperture.

2. The method of claim 1, wherein the cutting the first and second substrates includes forming an aperture in the seal pattern by cutting part of the dummy pattern of the seal pattern.

3. The method of claim 2, wherein the adjusting the amount of liquid crystal includes removing surplus liquid crystal from the at least one unit panel through the aperture by pressurizing a surface of the at least one unit panel.

4. The method of claim 3, further comprising encapsulating the aperture.

5. The method of claim 4, wherein the encapsulating of the aperture comprises:
injecting a seal material to the aperture; and
hardening the seal material.

6. The method of claim 2, wherein the adjusting the amount of liquid crystal includes injecting a predetermined amount of liquid crystal to at least one unit panel through the aperture.

7. The method of claim 6, further comprising encapsulating the aperture.

8. The method of claim 7, wherein the encapsulating of the aperture comprises:
injecting a seal material to the aperture; and
hardening the seal material.

9. The method of claim 1, wherein the cutting the first and second substrates includes thinning a section of the dummy pattern by partially cutting the dummy pattern to provide a thinned portion of the dummy pattern.

10. The method of claim 9, wherein the thinned portion of the dummy pattern has a thickness such that the thinned portion is burst when pressure is applied to the at least one unit panel.

11. The method of claim 1, wherein the encapsulating of the aperture comprises:
injecting a seal material to the aperture; and
hardening the seal material.

12. The method of claim 1, wherein preparing the first substrate includes forming a plurality of thin film transistors on the first substrate and preparing the substrate includes forming a color filter on the second substrate.

13. The method of claim 12, wherein the seal pattern is formed on the first substrate.

14. The method of claim 12, wherein the liquid crystal is dispensed onto the second substrate.

15. A method of fabricating a liquid crystal display device, comprising:

preparing a first substrate;

preparing a second substrate, the first substrate and the second substrate including a plurality of unit panel regions;

forming a seal pattern substantially along an outer edge of the unit panel regions, the seal pattern having a protruding portion extending to one side of the seal pattern;

dispensing liquid crystal more than a predetermined reference amount to the panel regions;

bonding the first and second substrates by the seal pattern;

hardening the seal pattern;

separating the bonded first and second substrates into a plurality of liquid crystal panels by cutting the first and second substrates outside edges of the seal pattern except the protruding portion of the seal pattern and cutting the protruding portion;

discharging a portion of liquid crystal from the liquid crystal panel through the cut protruding portion; and encapsulating the cut protruding portion using an encapsulating material.

16. The method of claim 15, wherein the first substrate is a thin film transistor array panel, and the second panel is a color filter substrate.

17. A method of fabricating a liquid crystal display device, comprising:

preparing a first substrate;

preparing a second substrate, the first substrate and the second substrate including a plurality of unit panel regions;

forming a seal pattern substantially along an outer edge of the unit panel regions, the seal pattern having a protruding portion extending to one side of the seal pattern;

dispensing liquid crystal more than a predetermined reference amount to the panel regions;

bonding the first and second substrates by the seal pattern;

hardening the seal pattern;

separating the bonded first and second substrates into a plurality of panels by cutting the first and second substrates outside edges of the seal pattern, wherein the protruding portion is cut such that part of the protruding portion of the seal pattern remains;

forming an aperture by bursting the remaining part of protruding portion of the seal pattern by pressurizing the liquid crystal panel;

discharging a portion of the liquid crystal from the liquid crystal panel through the aperture; and encapsulating the aperture by using an encapsulating material.

18. The method of claim 17, wherein the part of the protruding portion has a thinner after said.

* * * * *